United States Patent
Hachiya et al.

(10) Patent No.: US 7,308,200 B2
(45) Date of Patent: Dec. 11, 2007

(54) PRE-EMPHASIS CONTROL METHOD IN CONSIDERATION OF NONLINEAR DETERIORATION

(75) Inventors: Nobuhide Hachiya, Sapporo (JP); Hiroshi Oikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 10/368,379

(22) Filed: Feb. 20, 2003

(65) Prior Publication Data
US 2004/0042793 A1    Mar. 4, 2004

(30) Foreign Application Priority Data
Aug. 29, 2002  (JP)  ............... 2002-251896

(51) Int. Cl.
*H04J 14/02*    (2006.01)
(52) U.S. Cl. .................. 398/79; 398/34; 398/94
(58) Field of Classification Search ............ 398/34, 398/79, 94–95, 120, 147–148, 192–197, 398/199
See application file for complete search history.

(56) References Cited

U.S. PATENT DOCUMENTS

| | | | |
|---|---|---|---|
| 5,790,289 A | * | 8/1998 | Taga et al. ............ 398/79 |
| 6,445,471 B1 | * | 9/2002 | Shimokawa et al. ........ 398/79 |
| 6,934,479 B2 | * | 8/2005 | Sakamoto et al. ........ 398/193 |
| 2002/0054648 A1 | * | 5/2002 | Krummrich et al. ....... 375/295 |
| 2003/0219198 A1 | * | 11/2003 | Zhou ...................... 385/24 |

FOREIGN PATENT DOCUMENTS

JP    A-2000-294858    10/2000

* cited by examiner

*Primary Examiner*—Dzung Tran
(74) *Attorney, Agent, or Firm*—Staas & Halsey LLP

(57) ABSTRACT

A pre-emphasis control method automatically and appropriately performs the pre-emphasis of each wavelength in a wavelength division multiplexing communications system. Before instructing pre-emphasis for a transmitting unit, the optical power of an optical signal of each channel (wavelength) is increased/decreased by a predetermined value, and it is determined for each channel whether or not the difference between a Q value when the optical power is large and a Q value when the optical power is small, is larger than 0. Depending on the determination, that is, if the difference is larger than 0, then it is determined that the channel belongs to a linear area, and if the different is equal to or smaller than 0, then the channel belongs to a nonlinear area. If the Q value of each channel is to be improved by the pre-emphasis, then the optical power is increased for the channel in the linear area, and decreased for the channel in the nonlinear area.

11 Claims, 5 Drawing Sheets

PRE-EMPHASIS CONTROL METHOD IN CONSIDERATION OF NONLINEAR DETERIORATION

BACKGROUND OF THE INVENTION

1. Field of the Invention

The present invention relates to a pre-emphasis control method for use with a wavelength division multiplexing communications system.

2. Description of the Related Art

Recently, an optical communications network has been realized as a communications circuit. Especially, to realize a high-speed large-capacity data communications, a WDM (wavelength division multiplexing) communications system is the dominating optical communications. It is expected that larger capacity and higher speed communications circuits are demanded and the development of a system which allows such communications capacity is strongly desired.

Under the circumstances, a system for further increasing the number of multiplexed wavelengths of the WDM communications system for higher-speed communications has been developed. For example, a DWDM (dense wavelength division multiplexing) communications system has been devised as a WDM communications system. In the conventional WDM communications system, the number of multiplexed wavelengths is 32 or so while 100 or more wavelengths are being used in the DWDM communications system.

In the above mentioned optical communications system, it is necessary for a receiver to correctly receive an optical signal transmitted by a transmitter. In this connection, however, there arise some interfering factors by using an optical fiber. They are, for example, wavelength dispersion, a nonlinear effect, etc. To correctly receive a signal by a receiver, it is necessary that the Q value of the received signal is large, but the received waveform is degraded by wavelength dispersion, a nonlinear effect, etc., and the Q value often becomes unexpectedly small.

Therefore, to reserve an acceptable Q value, a conventional method of leveling the Q value in a receiving station has been used by adjusting the optical output of a transmitting station for each channel. Specifically, in the conventional technology, the improvement of the Q value is adjusted simply by increasing the optical output.

On the other hand, the deviation of the Q value is recently enlarged in the receiving station by an extension of a signal band (13 nm to 30 nm or more) and an increasing number of signal wavelengths (32 wavelengths to 100 or more). Accordingly, some channels are subject to degradation by nonlinearity. In the pre-emphasis (improving the Q value by increasing the optical output) in the conventional method used with the above mentioned system, the Q value of the channel of nonlinear deterioration is lowered.

Furthermore, an increasing number of signal wavelengths hardens the manual adjustment by an operator, and it is desired that the following conditions can be standardized to perform automatic control.

(1) a process of checking each channel for nonlinear deterioration.

(2) a method for determining the pre-emphasis when a channel is deteriorated.

SUMMARY OF THE INVENTION

The present invention aims at providing a pre-emphasis control method capable of automatically and appropriately realizing the pre-emphasis on each wavelength in the wavelength division multiplexing communications system.

The method according to the present invention includes in the wavelength multiplexed optical communications system: a nonlinear area channel determination step of increasing or decreasing the optical power of an optical signal of each channel contained in a wavelength multiplexed optical signal by a predetermined amount, and determining whether each channel belongs to a linear area or a nonlinear area; and a pre-emphasis step of increasing the transmissive optical power of the transmitter when the channel whose Q value is to be improved belongs to a linear area, and decreasing the transmissive optical power of the transmitter when the channel whose Q value is to be improved belongs to a nonlinear area, when the Q value is improved at the terminal of the receiver of the optical signal of each channel.

According to the present invention, when the pre-emphasis is performed, it is automatically determined whether an optical signal of each channel belongs to a nonlinear area or linear area. Based on the determination, the pre-emphasis is appropriately performed, thereby automatically and appropriately performing the pre-emphasis in the system for transmitting/receiving a wavelength multiplexed optical signal into which a number of wavelength channels are multiplexed.

Especially, the method for determining whether a channel belongs to a linear area or a nonlinear area can be used while the system is in an in-service state. Therefore, the pre-emphasis can be automatically and appropriately controlled while the system is in the in-service state.

DESCRIPTION OF THE PREFERRED EMBODIMENTS

Figure 1:
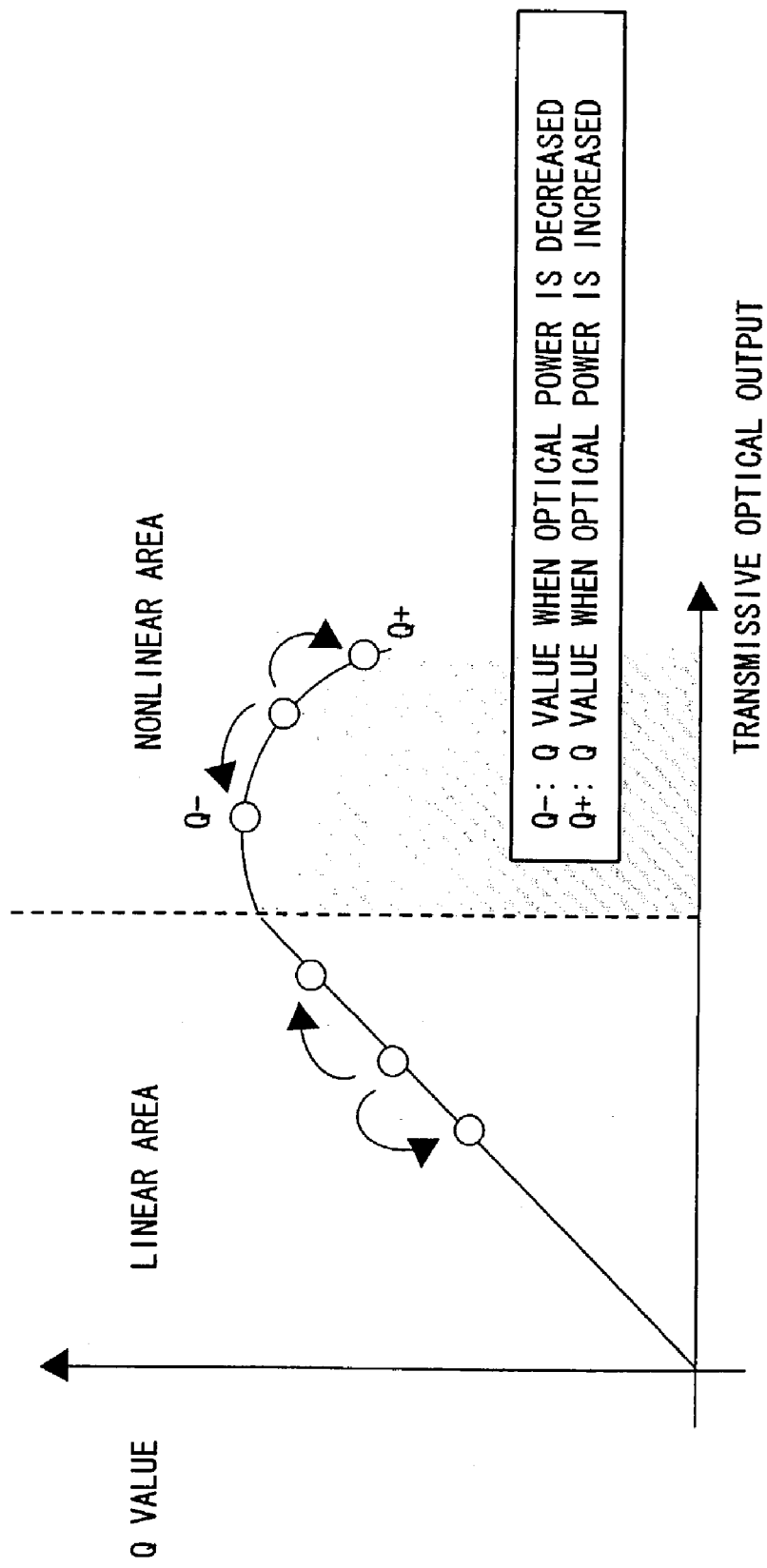
FIG. 1 shows the relationship between the transmissive optical output and the receiving station schematically.

FIG. 1 shows the relationship between the transmissive optical output and the Q value in the receiving station schematically.

In a long-distance DWDM (dense wavelength division multiplexing) communications system, it is indispensable to implement the pre-emphasis for adjusting the optical output for each channel in the transmitting station such that the Q value can be constant in the receiving station. In the conventional system in which all channels are processed only in the linear area shown in FIG. 1, the transmissive optical output is increased referring to the Q value when it is required to improve, and the optical output is decreased when it is required to degrade.

However, recently with an increasing number of multiplexed wavelengths and extended band, some channels have to be processed in a nonlinear area (a wavelength band where an optical signal is largely subject to a nonlinear effect, etc.). At this time, there arises the problem that it is not certain in advance in the conventional technology whether or not a received optical signal has suffered the nonlinear deterioration, and that the Q value is unexpectedly degraded when the optical output is increased in spite of an intention to improve the Q value when the pre-emphasis is performed on the channel (wavelength) indicating the nonlinear deterioration in the conventional method.

Figure 2:
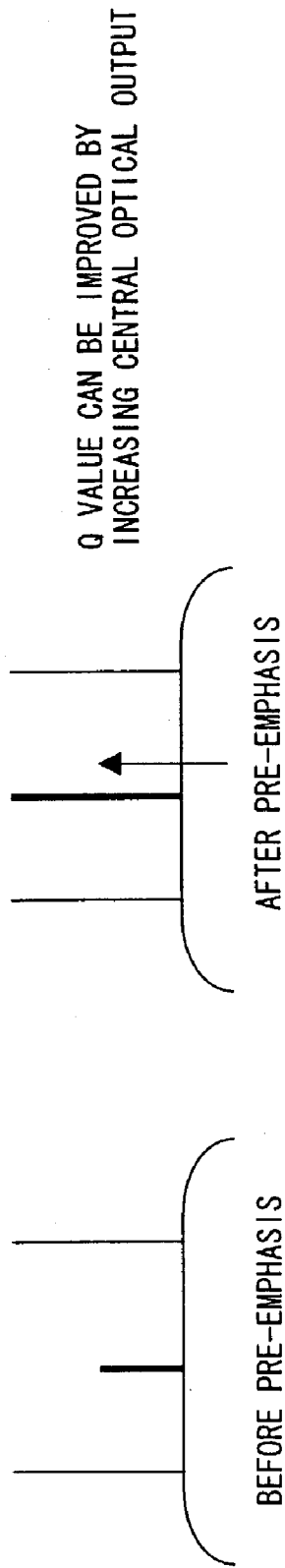
FIG. 2 shows the conventional pre-emphasis control method.

FIG. 2 shows the conventional pre-emphasis control method.

Assume that three waves of signals are multiplexed and received as shown in FIG. 2(a). In FIG. 2(a), the optical power of the central wavelength (channel) is the smallest and degraded in the Q value. Conventionally, as shown in FIG. 2(b), the pre-emphasis is performed such that the optical power of the wavelength of the central wavelength can be increased in the conventional method so that it can be received by the receiving station as having the same optical power as that of other wavelengths. However, as described above, in the long-distance DWDM communications system, some channels have to be processed in the nonlinear area. Therefore, if the pre-emphasis is performed on the optical signal in the nonlinear deterioration as described above, then the Q value is unexpectedly degraded.

In this situation, according to the embodiment of the present invention, it is checked whether or not the channel indicates nonlinear deterioration although it is in service. If it is, then the pre-emphasis is performed in a method other than the conventional method.

First, in the method according to the present embodiment, it is checked whether or not a corresponding optical signal belongs to a nonlinear area (whether or not it has suffered nonlinear deterioration). The determining method is carried out as follows.

(1) The current Q value and optical power are respectively set as Qo and Po.

(2) The optical power is increased such that the Q value does not greatly fluctuate (for example, about 0.5 dB), and the Q value is set as Q(+).

(3) The optical power is decreased from Po by the same amount as described in (2) above, and the Q value then is set as Q(−).

(4) Q(+) is compared with Q(−), and the linearity and the nonlinearity are defined as follows.

Q(+)−Q(−)>0: suffering no nonlinear deterioration.

Q(+)−Q(−)≦0: suffering nonlinear deterioration.

According to the present embodiment, the pre-emphasis is performed as follows based on the above mentioned determination.

Channel not suffering nonlinear deterioration: The transmissive optical power is increased as in the conventional method when the Q value is to be improved.

Channel suffering nonlinear deterioration: Unlike the conventional method, the transmissive optical power is decreased when the Q value is to be improved.

Figure 3:
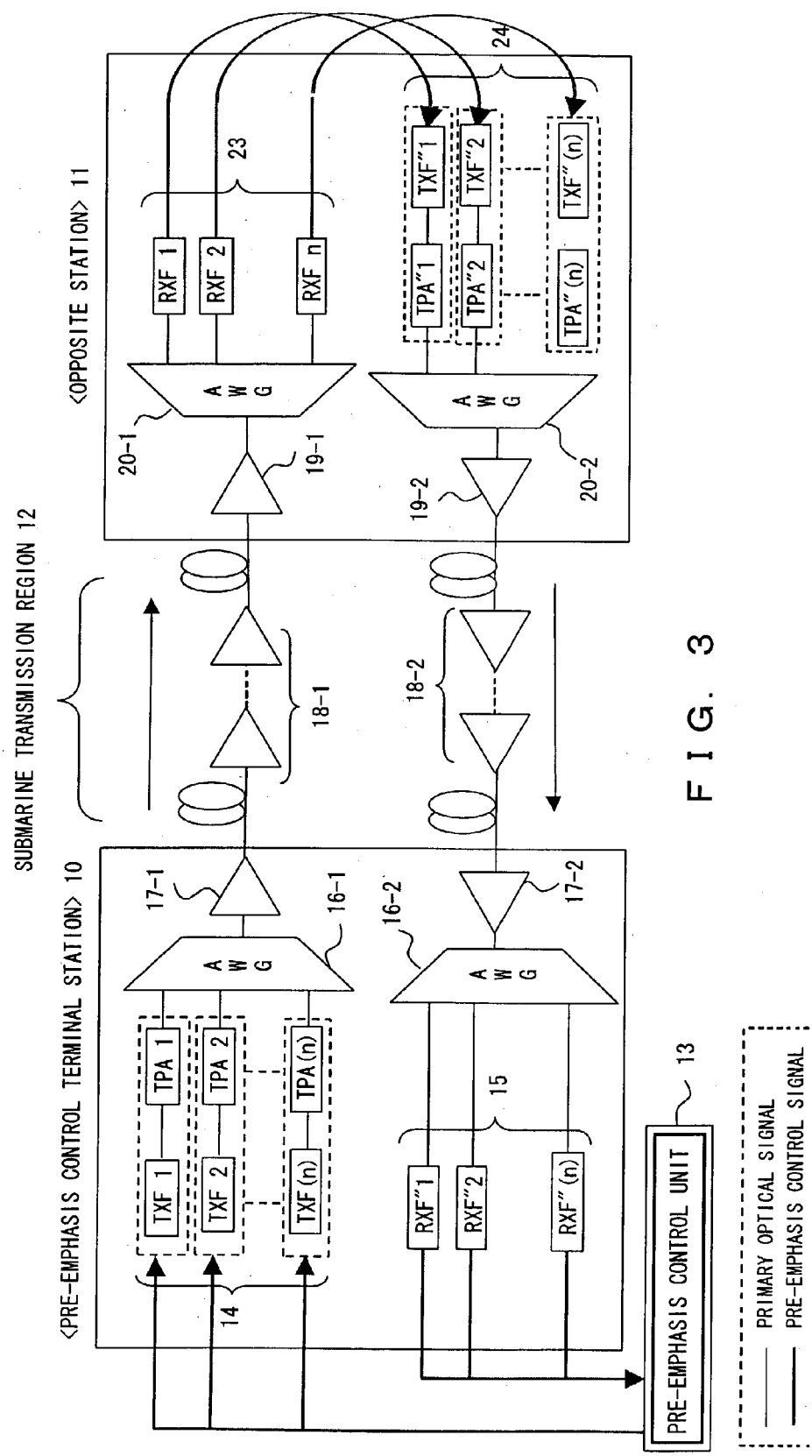
FIG. 3 shows an example of a configuration of the device for performing the pre-emphasis according to an embodiment of the present invention.

FIG. 3 shows an example of the configuration of the device for performing the pre-emphasis according to an embodiment of the present invention.

In FIG. 3, TXF is short for transmitter with super-FEC, RXF is an abbreviation for receiver with super-FEC, TPA is an abbreviation for transmit pre-emphasis amplifier, and AWG is an abbreviation for arrayed waveguide grating. In FIG. 3, AWG is used as an optical wavelength multiplexer and an optical wavelength demultiplexer.

The communications system shown in FIG. 3 comprises a pre-emphasis control terminal station 10, a submarine transmission region 12, and an opposite station 11. The pre-emphasis control terminal station 10 and the opposite station 11 have the basically the same configuration. The only difference is that the pre-emphasis control terminal station 10 is provided with a pre-emphasis control unit 13.

The number of transmitting devices 14 is equal to the number of multiplexed wavelengths, and there are TXF(m) (m=1~n) and TPA(m) ((m=1~n). TXF(m) generates and transmits an optical signal having a predetermined wavelength. Especially in the present embodiment, an overhead of FEC which is an error correction code is added to the frame of the optical signal, and the resultant signal is transmitted. TPA(m) is an amplifier for performing pre-emphasis and adjusting the transmissive optical power of each wavelength. The optical signal of each wavelength transmitted from the transmitting device 14 comprising TXF(m) and TPA(m) is wavelength-multiplexed by an AWG 16-1 for functioning as an optical wavelength multiplexer, and input into a pre-amplifier 17-1. The pre amplifier 17-1 amplifies the optical power of the wavelength multiplexed optical signal to an extent acceptable by the receiver with the attenuation of the optical power caused by the propagation of the optical signal in the submarine transmission region taken into account.

The wavelength multiplexed optical signal amplified by the pre-amplifier 17-1 is transmitted through the optical fiber, passed on by a repeater 18-1 provided in the optical fiber transmission line, and delivered to the opposite station 11. The opposite station 11 amplifies the received wavelength multiplexed optical signal by a post amplifier 19-1, and input into an AWG 20-1 for functioning as an optical wavelength multiplexer. The AWG 20-1 demultiplexes the wavelength multiplexed optical signal into optical signals of respective wavelengths, and the signals are received by RXF(m) (m=1~n) which are receiving units 23 for receiving the optical signals of the respective wavelengths. RXF(m) extracts an error correction code FEC, and receives an optical signal after detecting and correcting an error if an optical signal is erroneous.

The similar process is performed when an optical signal is transmitted from the opposite station 11 to the pre-emphasis control terminal station 10. That is, an optical signal of each wavelength is transmitted from a transmitting unit 24, the optical signals having the respective wavelengths are wavelength-multiplexed by an AWG 20-2 for functioning as an optical wavelength multiplexer, amplified by a pre-amplifier 19-2, and transmitted to the submarine transmission region 12. In the submarine transmission region 12, a post-amplifier 17-2 amplifies a wavelength multiplexed optical signal, an AWG 16-2 demultiplexes the wavelength multiplexed optical signal, and receiving units 15 for the respective wavelengths receive the signals.

When the pre-emphasis process is performed on a primary optical signal (an optical signal transmitted from the transmitting device 14) from the pre-emphasis control terminal station 10 to the opposite station 11, the pre-emphasis control unit 13 instructs the TPA(m) to control the optical power, and the RXF(n) to obtain the Q value information. A request for the Q value information and a reply to and from the RXF(n) are transmitted to the opposite station by the TXF(n) or TXF"(n) with the overhead portion of the FEC of the primary optical signal carrying the information.

Therefore, when each of the transmitting devices 14 transmits a signal with predetermined optical power at an instruction of the pre-emphasis control unit 13, the receiving unit 23 of the opposite station 11 measures the Q value of the optical signal of each wavelength, and notifies the transmitting unit 24 of the opposite station 11 of the result. The transmitting unit 24 sets the measured Q value in the overhead portion of the FEC of an optical signal of each wavelength, and transmits the optical signal to the pre-emphasis control terminal station 10.

The pre-emphasis control terminal station 10 retrieves the Q value of the optical signal of each wavelength on the receiver side, which is retrieved by the receiving unit 15 from the overhead portion of the FEC, and notifies the pre-emphasis control unit 13 of the value. The pre-emphasis control unit 13 controls the pre-emphasis according to the embodiment of the present invention based on the Q value.

Figure 4:
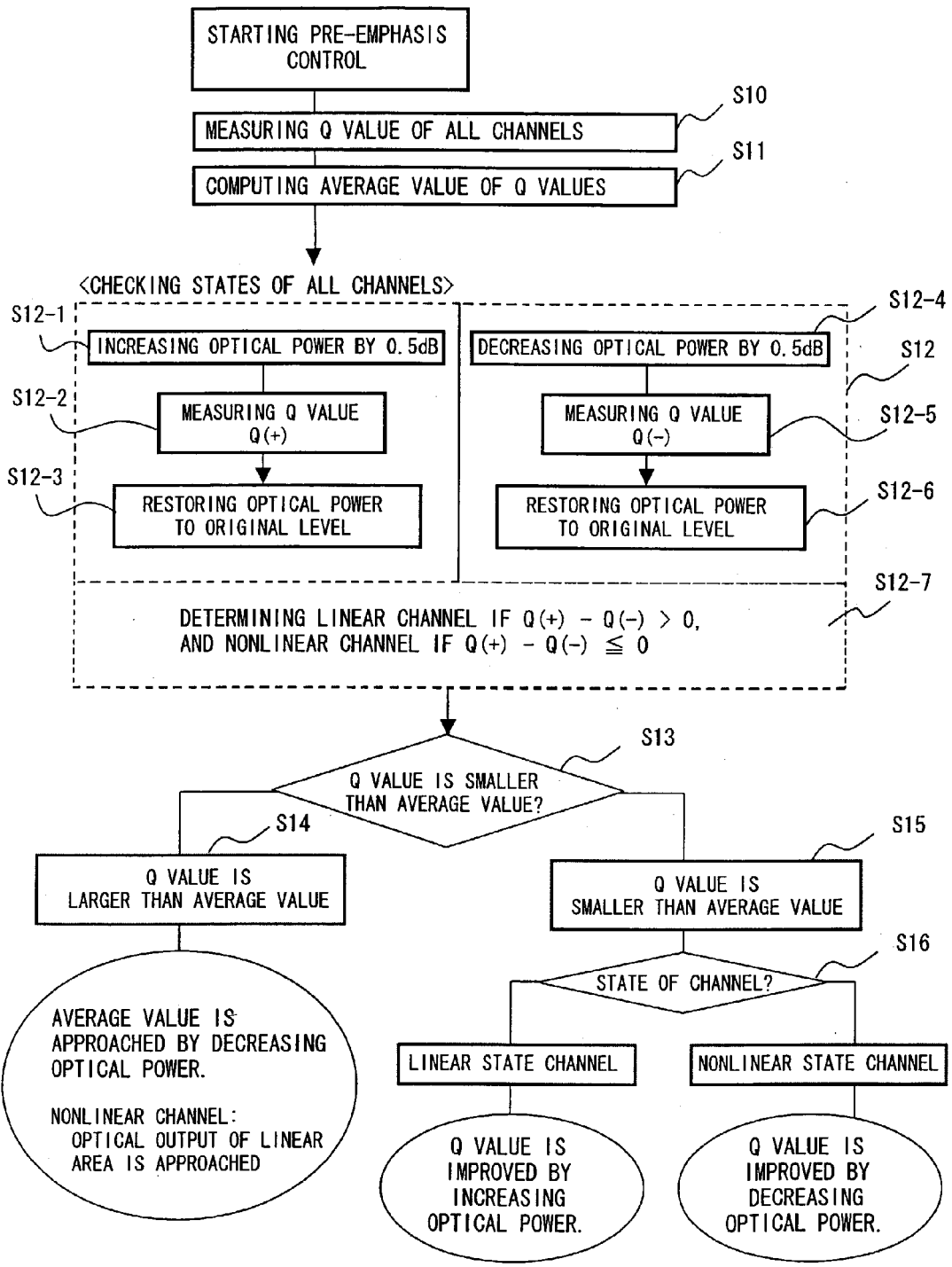
FIG. 4 is a flowchart for explanation of the pre-emphasis control method according to an embodiment of the present invention.

FIG. 4 is a flowchart of the pre-emphasis control method according to an embodiment of the present invention.

When the pre-emphasis control is first started, the Q values of all channels are measured in step S10. Then, in step S11, an average value of the measured Q values is computed.

In step S12, the states of all channels are checked. That is, in steps S12-1, the optical power of a channel is increased by, for example, 0.5 dB, the Q value of the channel, that is, Q(+) described above, is measured in step S12-2, and the optical power of the channel is restored to the original level in step S12-3. Similarly, in step S12-4, the optical power is decreased by 0.5 dB for all channels, the Q value, that is, Q(−) described above, is measured, and the optical power of the channel is restored to the original level.

Then, the processes in steps S12-1 through S12-6 are performed on all channels, and it is determined in step S12-7 whether or not Q(+)−Q(−) is larger than 0 for each channel. A channel indicating Q(+)−Q(−) larger than 0 is determined to be a channel in a linear area. On the other hand, a channel indicating Q(+)−Q(−) equal to or smaller than 0 is determined to be a channel in a nonlinear area.

Then, in step S13, it is determined whether or not the measured Q value in each channel is larger than an average value of the Q values. If it is determined that the value is larger than the average value (step S14), then the optical power is decreased when the channel belongs to a linear area to allow the value of the corresponding channel to approach the average value of the Q values. If the channel belongs to a nonlinear area, then the optical power of the corresponding channel is made to approach the optical power of the channel in the linear area.

If it is determined in step S13 that the Q value of a channel is smaller than the average value (step S15), The state of the channel is determined in step S16. If the channel belongs to a linear area, then the optical power of the channel is increased to improve the Q value. If the channel belongs to a nonlinear area and suffers nonlinear deterioration, then the optical power of the channel is decreased to improve the Q value.

If the Q value of a channel is larger than the average value, then the optical power is made to approach the average value regardless of whether the channel belongs to a linear area or a nonlinear area. Because the optical power gradually increases in the entire wavelength multiplexed optical signals as the control continues to make the Q value good, thereby it is conducted to protect against the infinite increase of the optical power.

Figure 5:
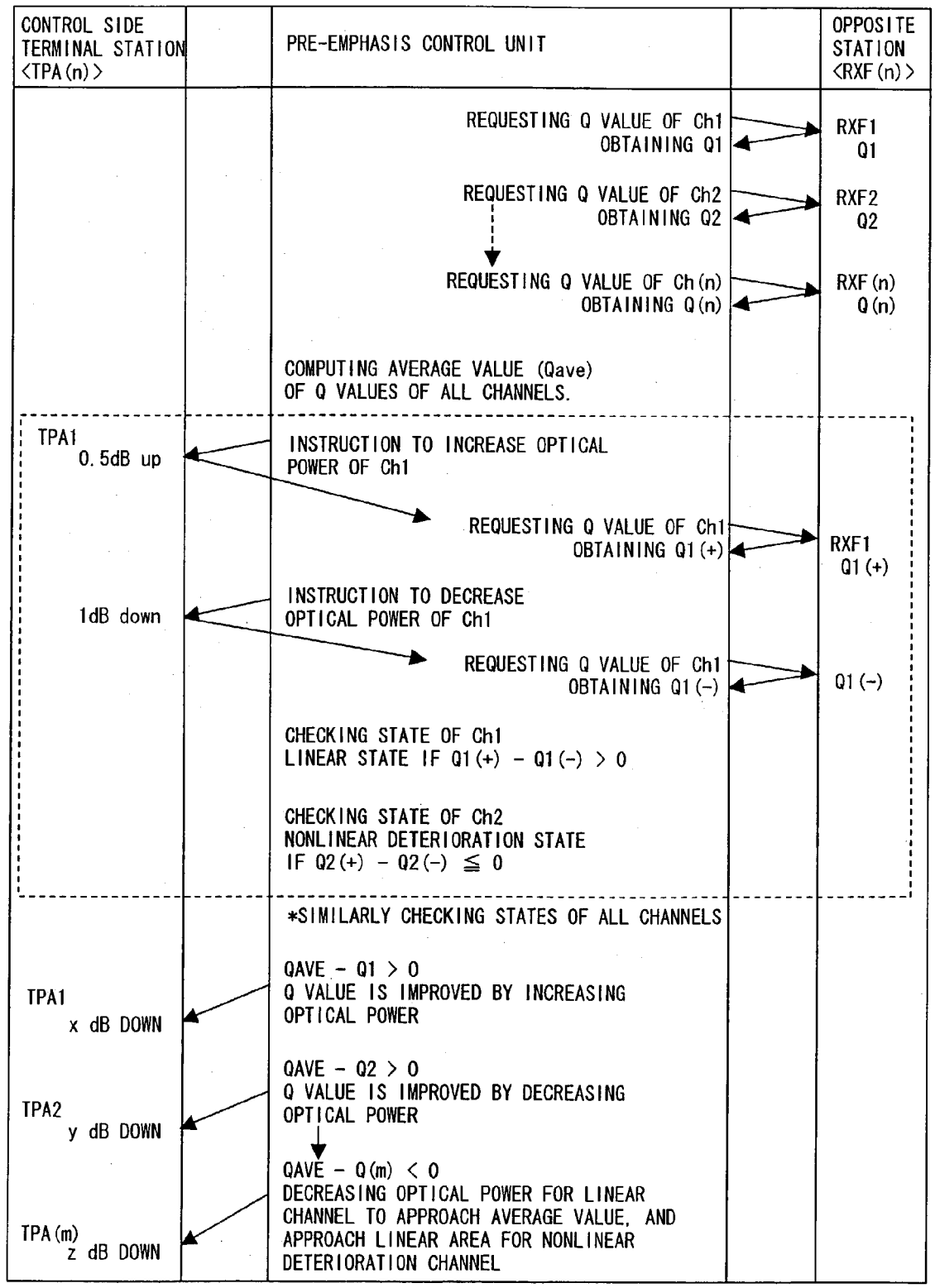
FIG. 5 shows a sequence of the pre-emphasis control method according to an embodiment of the present invention.

FIG. 5 shows the sequence of the pre-emphasis control method according to the embodiment of the present invention.

In this sequence, it is assumed that the channel 1 (ch 1) belongs to a linear area, and the channel 2 (ch 2) belongs to a nonlinear area.

First, the pre-emphasis control unit requests the receiving unit (RXF(m)) of the opposite station to obtain the Q value of each channel. Then, the Q values of all channels 1~n, that is, Q1~Q(n) can be obtained.

Then, an average value Qave of Q1~Q(n) is computed. Then, the pre-emphasis control unit instructs the TPA(m) of the transmitting unit of the pre-emphasis control unit to obtain the Q value for determination as to whether each channel belongs to a linear area or a nonlinear area. First, in the sequence shown in FIG. 5, the pre-emphasis control unit instructs the TPA1 to increase the optical power of the channel 1. At the instruction, the TPA1 increases the optical power of the channel 1 by 0.5 dB. The amount of the optical power to be increased depends on those skilled in the art.

The pre-emphasis control unit requests the RXF1 of the opposite station for the Q value of the channel 1 after the TPAL increases the optical power. In response to the request, the RXF1 measures the Q value, and notifies the pre-emphasis control unit of the result. Thus, the pre-emphasis control unit obtains Q1(+) which is Q(+) of the channel 1.

Then, the pre-emphasis control unit instructs the TPA1 to decrease the optical power of the channel 1. At the instruction, the TPA1 decreases the optical power of the channel 1 by 0.5 dB×2=1 dB. Then, the pre-emphasis control unit requests the RXF1 of the opposite station for the Q value of the channel 1, and obtains Q1(−) which is Q(−) for the channel 1.

The processes of obtaining Q(+) and Q(−) are repeated on each channel. When the information is obtained about all channels, the pre-emphasis control unit computes Q(+) and Q(−) for each channel, determines whether or not each of the obtained values is larger than 0 to determine whether each channel belongs to a linear area or a nonlinear area. Since the channel 1 belongs to a linear area and the channel 2 belongs to a nonlinear area in this example, Q1(+)−Q1(−) of the channel 1 is larger than 0, and Q2(+)−Q2(−) of the channel 2 is equal to or smaller than 0.

Then, the pre-emphasis control unit computes Qave−Q(m), and issues a pre-emphasis command to a TPA(m) That is, if Qave−Q1>0, then the channel 1 belongs to a linear area, and the pre-emphasis control unit issues an instruction to increase the optical power of the channel 1 to the TPA1 to improve the Q value. If Qave−Q2>0, then the channel 2 belongs to a nonlinear area, and the pre-emphasis control unit issues an instruction to decrease the optical power of the channel 1 to the TPA1 to improve the Q value. The control is performed on all channels 1 through n. For example, if Qave−Q(m)<0 for channel m, then the pre-emphasis control unit instructs the TPA(m) to decrease the optical power because if the channel m belongs to a linear area, the Q value is to be improved by making the optical power of the channel m approach the average value, and if the channel m belongs to a nonlinear area, the optical power of the channel m is made to approach the optical power of the channel in the linear area, and the current high Q value is to be smaller by decreasing an unnecessarily large optical power.

In the above mentioned processes, the amount of optical power to be increased or decreased by the TPA1 through TPA(n) is variable and appropriately specified by the pre-emphasis control unit.

Since the above mentioned processes can be performed regardless of whether or not the system is in service, the optimum control of pre-emphasis can be performed when the system is in service.

According to the present invention, the pre-emphasis can be performed in the DWDM communications system without any problems although the system includes a channel belonging to a nonlinear area.

What is claimed is:

1. A method for use with a wavelength multiplexed optical communications system, comprising:
    increasing or decreasing optical power of an optical signal of each channel contained in a wavelength multiplexed optical signal by a predetermined amount, and determining whether each channel belongs to a linear area or a nonlinear area by obtaining a first Q value by adjusting power level down from a first power level, obtaining a second Q value by adjusting power level up from the first power level, comparing the first Q value with the second Q value and a result of the comparing indicating whether in a non-linear or linear area; and
    conducting pre-emphasis by increasing transmissive optical power of a transmitter when a channel whose Q value is to be improved belongs to a linear area, and decreasing the transmissive optical power of the transmitter when a channel whose Q value is to be improved belongs to a nonlinear area if the Q value is improved at a terminal of a receiver of the optical signal of each channel.

2. The method according to claim 1, wherein in said nonlinear area channel determination step, if the Q value at the terminal of the receiver when the optical power is increased is smaller than the Q value at the terminal of the receiver when the optical power is decreased, then a corresponding channel belongs to a nonlinear area.

3. The method according to claim 1, wherein in said pre-emphasis step, if the Q value a channel is larger than an average value of Q values in all channels contained in a wavelength multiplexed optical signal, then the optical power of the channel is to be decreased.

4. The method according to claim 1, wherein the predetermined amount in said nonlinear area channel determination step changes the optical power by 0.5 dB.

5. A method as recited in claim 1, wherein the determining whether each channel belongs to a linear area or a nonlinear area is by a change of the Q value corresponding to a change of the optical power.

6. A linear/nonlinear channel determining method for use in a wavelength multiplexed communications system, comprising
    increasing/decreasing optical power of an optical signal of each channel contained in a wavelength multiplexed optical signal by a predetermined amount, and determining that a channel which changes the optical power when a Q value at a terminal of a receiver when the optical power is large is smaller than a Q value at the terminal of the receiver when the optical power is small belongs to a nonlinear area, and that a channel which changes the optical power belongs to a linear area in other cases by obtaining a first Q value by adjusting power level down from a first power level, obtaining a second Q value by adjusting power level up from the first power level, comparing the first Q value with the second Q value and a result of the comparing indicating whether in a non-linear or linear area.

7. An apparatus for use with a wavelength multiplexed optical communications system, comprising:
    a nonlinear area channel determination unit increasing or decreasing optical power of an optical signal of each channel contained in a wavelength multiplexed optical signal by a predetermined amount, and determining whether each channel belongs to a linear area or a nonlinear area by obtaining a first Q value by adjusting power level down from a first power level, obtaining a second Q value by adjusting power level up from the first power level, comparing the first Q value with the second Q value and a result of the comparing indicating whether in a non-linear or linear area; and
    a pre-emphasis unit increasing transmissive optical power of a transmitter when a channel whose Q value is to be improved belongs to a linear area, and decreasing the transmissive optical power of the transmitter when a channel whose Q value is to be improved belongs to a nonlinear area if the Q value is improved at a terminal of a receiver of the optical signal of each channel.

8. The apparatus according to claim 7, wherein in said nonlinear area channel determination unit, if the Q value at the terminal of the receiver when the optical power is increased is smaller than the Q value at the terminal of the receiver when the optical power is decreased, then a corresponding channel belongs to a nonlinear area.

9. The apparatus according to claim 7, wherein in said pre-emphasis unit, if the Q value of a channel is larger than an average value of Q values in all channels contained in a wavelength multiplexed optical signal, then the optical power of the channel is to be decreased.

10. The apparatus according to claim 7, wherein the predetermined amount in said nonlinear area channel determination unit changes the optical power by 0.5 dB.

11. A method for use with a wavelength multiplexed optical communications system, comprising:
    increasing or decreasing optical power of an optical signal of each channel contained in a wavelength multiplexed optical signal by a predetermined amount, and determining whether each channel belongs to a linear area or a nonlinear area by obtaining a first Q value by adjusting power level up from a first power level, obtaining a second Q value by adjusting power level down from the first power level, subtracting first Q value from the second Q value and designating a non-linear area when a subtraction result is less than or equal to zero; and
    conducting pre-emphasis by increasing transmissive optical power of a transmitter when a channel whose Q value is to be improved belongs to a linear area, and decreasing the transmissive optical power of the transmitter when a channel whose Q value is to be improved belongs to a nonlinear area if the Q value is improved at a terminal of a receiver of the optical signal of each channel.

* * * * *